United States Patent [19]

Bakken et al.

[11] 4,395,143

[45] Jul. 26, 1983

[54] ANNULAR, FLEXIBLE BEARINGS FOR RADIAL LOADS

[75] Inventors: Gordon J. Bakken, Buzzards Bay, Mass.; Alfred R. Randall, Brigham City, Utah; Richard W. Bodily, Malad, Id.

[73] Assignee: Thiokol Corporation, Newtown, Pa.

[21] Appl. No.: 934,754

[22] Filed: Aug. 21, 1978

[51] Int. Cl.³ .................................................. F16C 27/02
[52] U.S. Cl. .................................... 384/221; 308/2 A; 403/225; 416/134 A
[58] Field of Search .................... 308/26, 28, 244, 238, 308/237 R, 139, 237 A, 74, 2 R, 184 R, 184 A, DIG. 8, 72, 2 A; 267/57.1 R, 57.1 A, 63 R; 416/134 R, 500, 134 A, 140, 141; 403/225–228, 221–224; 244/17.27; 384/221

[56] References Cited

U.S. PATENT DOCUMENTS

| 3,787,102 | 1/1974 | Moran | 308/26 |
| 3,984,152 | 10/1976 | Haines | 308/237 R |
| 4,063,787 | 12/1977 | Bakken et al. | 308/26 |

Primary Examiner—Douglas C. Butler
Attorney, Agent, or Firm—E. E. McCullough

[57] ABSTRACT

A bearing assembly of concentric, cylindrical or conic rigid layers alternated with and bonded to elastomeric layers is bonded to a rigid, inner ring. A protective outer ring surrounds the bearing assembly and is equipped with devices for compressing the elastomeric layers to prevent bond failure between the layers when the assembly is subjected to radial loads. Bond failure is especially likely in bearings of this type because of tensile stresses built into the elastomer as a result of its tendency to shrink during its cure process. The bearing assemblies are conic in form, so that the elastomeric layers can be compressed by axial displacement of the rigid layers when the inner and outer rings are drawn together axially.

4 Claims, 5 Drawing Figures

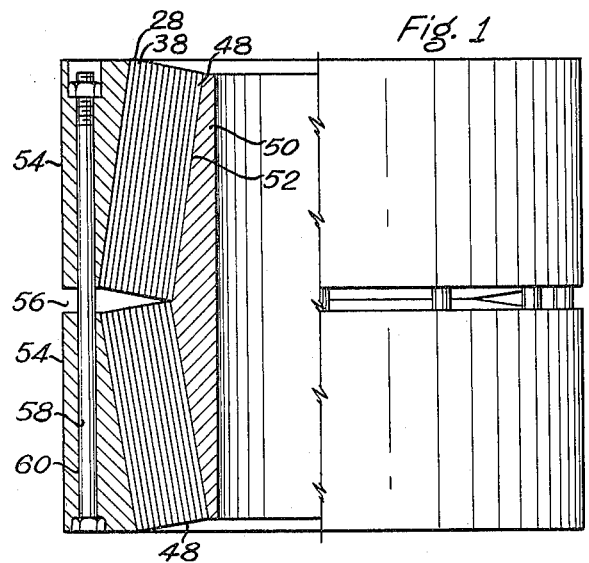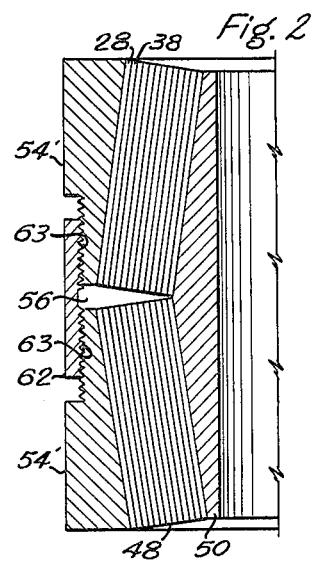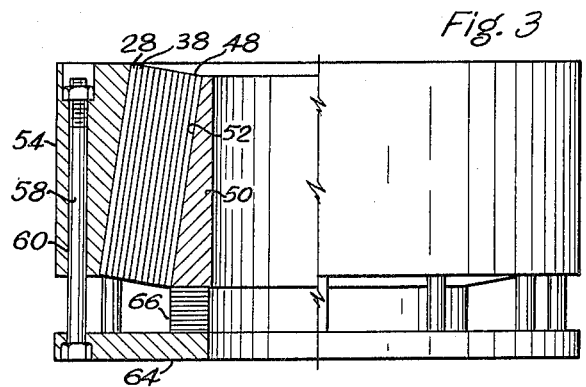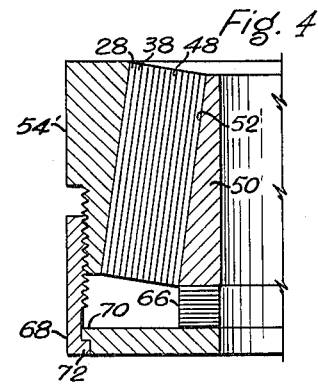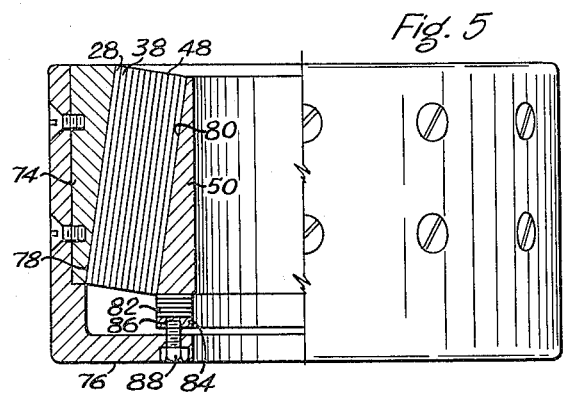

ANNULAR, FLEXIBLE BEARINGS FOR RADIAL LOADS

The Government has rights in this invention pursuant to Contract No. DAAJ02-73-C-0091, awarded by the U.S. Army.

BACKGROUND OF THE INVENTION

This invention relates broadly to flexible bearings. More specifically, it relates to bearings constructed of alternate, concentric, annular layers of elastomer and rigid material or shims, each layer being bonded to adjacent layers; and to such bearings that are substantially free of internal, tensile stresses.

There are many used for annular bearings of the type having alternate, annular, concentric layers of elastomer and rigid material bonded together. A use of particular concern in the present invention is for supporting helicopter rotors relative to the central hub thereof. In such an application, the bearings are subjected to a preponderant, unidirectional force in a vertical plane, relative to the helicopter. Whenever the bearing is subjected to a side force, perpendicular to its axis, the portion between the center of the bearing and the impressed force is under compression, while the opposite half of the bearing is under tensile stresses. Bearings of this nature perform very well under compression; but are very weak under tension and tend to fail at the bond interfaces between the elastomeric and rigid layers. This tendency is aggravated by the fact that the elastomeric layers of such bearings usually have built-in tensile stresses caused by shrinkage during cure and cooling of the elastomer when the bearing is manufactured.

Flexible bearings of the type described herein are well known and are shown in patents such as in U.S. Pat. Nos. 3,787,102 to Morgan; 3,750,249 to Brandon et al; 2,995,907 to Orain; 3,941,433 to Dolling et al; and 3,387,839 to Miller et al. None of these patents, however, is concerned with the problem and solution therefor that comprises the subject matter of the present invention; i.e., means of producing such bearings that are free of internal, tensile stresses.

SUMMARY OF THE INVENTION

Objects of the present invention, therefore, are to overcome this difficulty in prior-art, flexible bearings by providing a bearing that is free of internal, tensile stresses, so that the operating life thereof is greatly extended; and to provide a manufacturing method for producing stress-free, cylindrical, flexible bearings that is simple and inexpensive.

An important feature of the invention, and an unexpected result, is that the compression exerted on the annular assembly of elastomeric and rigid layers increases the total stiffness of the bearing, so that a smaller bearing may be used for any given application than would be otherwise necessary. This is an important advantage where weight is critical, as in helicopters.

The invention has an annular assembly of concentric, conic rigid layers, equally spaced apart radially, and annularly filled with an elastomer that is bonded to the rigid layers. Means is provided for variably compressing the assembly of rigid layers and elastomer to obviate tensile stresses therein.

Further objects and advantages of the invention will become apparent as the following, detailed description is read with reference to the accompanying drawings. The same parts are designated with the same numbers throughout the disclosure.

BRIEF DESCRIPTION OF THE DRAWINGS

In the drawings:

FIG. 1 is a sectional view in elevation of third embodiment of the invention;

FIG. 2 is a portion of FIG. 1 showing an alternate compression means;

FIG. 3 is similar to FIG. 1 but shows another embodiment of the invention;

FIG. 4 is a portion of FIG. 3, showing an alternate compression means; and

FIG. 5 is similar to FIG. 3, showing another embodiment of the invention.

DESCRIPTION OF THE PREFERRED EMBODIMENTS

In a preferred embodiment of the invention, all rigid parts of the bearing are: rough machined from steel, according to the desired dimensions; ultrasonically inspected for possible flaws; and fine machined. After final inspections, the parts are grit blasted to improve adhesion of the elastomer thereto.

A natural, uncured, rubber formulation is then prepared and tested for the desired viscosity and shear modulus. A typical, preferred formulation is, in parts by weight:

Raw latex: 100
Carbon black: 30
Zinc oxide: 5
Sulfur: 0.6
Zinc 2-Ethyl hexanoate: 2
2-Morpholinothio benzothiazole: 1.44
Tetrabutylthiuram disulphide: 0.6
Poly-2,2,4-trimethyl 1-1,2dihydroquinoline: 2

The latex is Standard Malaysian Rubber Grade No. 5. The tetrabutylthiuram disulfide is available under the trade name, "Butyl Tuads," from the R. T. Vanderbilt Company of Los Angeles, California. The 2-morpholinothio benzothiazole is sold under the trade name, "Santocure MOR" from the Monsanto Company of St. Louis, Missouri. The poly-2,2,4-trimethyl 1-1,2-dihydroquinoline is available under the trade name, "Flectol H," also from Monsanto Company of St. Louis, Missouri. All ingredients are mixed together and thoroughly blended in a mechanical mixer, typically in 400-lb. batches.

When all mechanical parts are in place in a mold, the entire assembly and the uncured rubber composition are heated to about 200° F. This is the temperature at which fluidity of the rubber composition is greatest.

This rubber composition 38 is then poured into the spaces between the rigid layers 28, and the temperature is maintained at about 30° F. (150° C.) for about one-half hour, during which time the elastomer is cured. The assembly 36 of rigid layers 28 and elastomer 38 is then removed from the mold and any excess elastomer is machined off.

A number of other rubber compositions have been found to be useful in elastomeric bearings of the type described, including synthetic rubbers, and are well known in the art. The present invention is applicable to any such material that shrinks during its cure cycle. Also, rigid materials other than steel may be useful and desirable for use in making the layers 28 for specific applications of the bearing 30.

Each of the embodiments of the invention shown in FIG. 1 through FIG. 5 contains at least one bearing assembly 48 of rigid layers 28 and layers of elastomer 38 bonded together and having a form of a truncated cone. This conical configuration eliminates tensile stresses in the elastomer in two different ways: (1) As the elastomer 38 shrinks during its cure process, the adjacent rigid layers 28 are drawn together to compensate for the diminished volume of elastomer; and (2) the resulting assembly is capable of being compressed by clamping devices that move the outermost and innermost rigid layers toward each other axially via outer and inner rings. Support means, operatively attached to one of the rings, provides a base for moving the other ring with screw means. In these embodiments, the assemblies 48 of rigid layers and elastomer are preferably manufactured in molds as described above and then bonded to adjacent parts.

The embodiment shown in FIG. 1 has an inner ring 50 having an outer surface 52 formed by two opposing cones, so that the central portion thereof is thicker than the ends. Two bearings assemblies 48 of rigid layers and elastomer are fitted over the conical surfaces of the inner ring 50 and bonded thereto. Two cylindrical, outer rings 54, have conical inner surfaces, are fitted over the assemblies 48 and are bonded thereto, leaving a gap 56 between the outer rings 54. A plurality of long screws 58 pass through aligned holes 60 in the outer rings 54 so that compressive force may be exerted on the assemblies 48 by tightening the screws 58, thereby drawing the outer rings 54 together.

An alternate compression means for the embodiment of FIG. 1, shown in FIG. 2, has the form of an annular turnbuckle 62. External threads 63 on each of the outer rings 54' are in opposite directions, as are the two sets of internal threads of the turnbuckle 62; so that, when the turnbuckle 62 is rotated, the outer rings 54' may be drawn together.

The embodiment of the invention shown in FIG. 2 is identical to the upper half of that shown in FIG. 1, so that only one bearing assembly 48, one outer ring 54, and one conical outer surface 52 on the inner ring 50 are used. The lower half of the bearing, as it appears in FIG. 1, is replaced by an annular plate 64, which is spaced away from the inner ring 50 by an annular flexible bearing pad 66 constructed of alternate flat layers of rigid material and elastomer stacked and bonded together similar to the construction of the assembly 48. The annular bearing pad 66 is bonded on one side to the plate 64 and on the other side to thick edge of the inner ring 50. The screws 58 pass through aligned holes in the plate 64; so that pressure may be exerted on the assembly 48 by tightening the screws 58 in the same manner as in the embodiment of FIG. 1.

FIG. 4 shows an alternate compression means for use in the embodiment shown in FIG. 3. A retaining sleeve 68 has internal threads that engage external threads on the outer ring 54'. The plate 64 has a short, outwardly extending flange 70 that is engaged by a short, inwardly extending flange 72 on the retaining sleeve 68. When the retaining sleeve 68 is rotated, pressure is exerted via the flat bearing pad 66 on the inner ring 50 to achieve compression on the bearing assembly 48.

In another embodiment of the invention shown in FIG. 5, the outer ring 74 has an internal, conical surface, similar to those of FIGS. 1 and 3, and an inwardly extending flange 76. A conical bearing assembly 48 of rigid layers and elastomer is bonded to the conical surface 78 of the outer ring 74, and the conical surface 80 of the inner ring 50 is bonded to the inner surface of the assembly 48. A flat, annular bearing pad 82, identical to the bearing pad 66, is bonded on one side to the thick edge of the inner ring 50 as in FIG. 3. However, in this embodiment, the bearing pad 82 is bonded on its other side to a bearing ring 84 having recesses 86. A plurality of screws 88, engaged by threads to the flange 76, engage the recesses 86 of the bearing ring 84, so that compression may be exerted on the assembly 48 by extending the screws 88 forceably into the recesses 86.

An invention has been described that comprises an advance in the art of flexible bearings. Although the embodiments has been described in specific detail, it should be noted that many details may be altered without departing from the scope of the invention, as it is defined in the following claims. It should be noted that, with the screw means described, variable compression on the elastomer is possible, so that the compressive force may be regulated as appropriate.

The invention claimed is:

1. An annular, flexible bearing comprising:

a bearing assembly comprising concentric, annular, conic layers of rigid material and similarly shaped layers of elastomer alternately arranged therewith, each said layer being bonded to adjacent layers;

an inner ring having an inner, cylindrical surface and an outer, conic surface bonded to the inner, conic surface of the bearing assembly;

an outer ring having an inner, conic surface bonded to the outer conic surface of the bearing assembly;

an annular plate having an inner diameter slightly larger than that of the inner ring; and a flexible, annular bearing pad comprising alternate layers of rigid material and elastomer stacked and bonded together, the bearing pad being bonded on one side to the thicker edge of the inner ring; and means for compressing said bearing assembly by moving the annular plate toward the outer ring in an axial direction, and moving the inner ring via the annular bearing pad.

2. The bearing of claim 1 wherein the means for drawing the annular plate toward the outer ring is a plurality of screws, each passing through aligned holes in the outer ring and the annular plate.

3. The bearing of claim 1 wherein the means for drawing the annular plate toward the outer ring is a short, retaining sleeve having internal threads engaged to external threads on the outer ring and having a short, inwardly-extending flange at its other end engaging a short, outwardly-extending flange on the annular plate.

4. The bearing of claim 1 wherein said annular plate has the form of an inwardly-extending flange fixed to the thinner edge of the outer ring, and further including an annular bearing plate, having recesses, bonded to the other side of the bearing pad and wherein the means for drawing an annular plate toward the outer ring is a plurality of screws engaging threaded holes in the flange and extending into the recesses of the bearing plate.

* * * * *

UNITED STATES PATENT AND TRADEMARK OFFICE
CERTIFICATE OF CORRECTION

PATENT NO. : 4,395,143

DATED : JULY 26, 1983

INVENTOR(S) : BAKKEN ET AL.

It is certified that error appears in the above—identified patent and that said Letters Patent is hereby corrected as shown below:

Col. 1, Line 16 change "used" to --uses--

Col. 2, Line 56 change "30°" to --300°--; and

Col. 3, Line 39 change "FIG.2" to --FIG.3--.

Signed and Sealed this

Twenty-second Day of November 1983

[SEAL]

Attest:

GERALD J. MOSSINGHOFF

Attesting Officer     Commissioner of Patents and Trademarks